United States Patent
Masuda

(10) Patent No.: US 8,365,681 B2
(45) Date of Patent: Feb. 5, 2013

(54) INDICATING INSTRUMENT

(75) Inventor: Hideki Masuda, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 218 days.

(21) Appl. No.: 12/811,325

(22) PCT Filed: Dec. 16, 2008

(86) PCT No.: PCT/JP2008/072799
§ 371 (c)(1),
(2), (4) Date: Jun. 30, 2010

(87) PCT Pub. No.: WO2009/087865
PCT Pub. Date: Jul. 16, 2009

(65) Prior Publication Data
US 2010/0288183 A1    Nov. 18, 2010

(30) Foreign Application Priority Data

Jan. 10, 2008    (JP) ................................. 2008-002947

(51) Int. Cl.
*G01D 7/00*    (2006.01)
(52) U.S. Cl. .... 116/303; 116/204; 116/288; 116/DIG. 6
(58) Field of Classification Search ................. 116/204, 116/287, 303, 62.4, 286, 62.1, 288, 290, 116/292, 294, 284, DIG. 6, DIG. 36
See application file for complete search history.

(56) References Cited

U.S. PATENT DOCUMENTS

| | | | |
|---|---|---|---|
| 2,371,511 A | * | 3/1945 | Faus .............................. 116/284 |
| 3,776,176 A | * | 12/1973 | Doyle ........................... 116/288 |
| 4,016,827 A | * | 4/1977 | Lawrence, Jr. ................ 116/204 |
| 4,090,131 A | * | 5/1978 | Mas ............................... 324/146 |
| 4,186,609 A | * | 2/1980 | Baermann ........................ 73/497 |
| 4,195,518 A | * | 4/1980 | Fees ........................... 73/861.57 |
| 4,878,453 A | * | 11/1989 | Inoue et al. .................... 116/288 |

(Continued)

FOREIGN PATENT DOCUMENTS

| | | |
|---|---|---|
| JP | 3-44624 | 4/1991 |
| JP | 5-81643 | 11/1993 |

(Continued)

*Primary Examiner* — Peter Macchiarolo
*Assistant Examiner* — Tania Courson
(74) *Attorney, Agent, or Firm* — McDermott Will & Emery LLP

(57) ABSTRACT

An indicating instrument is provided in which a pointer is secured to pointer drive means by attraction force of magnets and the magnetic influence of the magnets can be reduced to improve the indication accuracy of the pointer. The indicating instrument has a display plate 21, a pointer 22 provided on the front-face side of the display plate 21, and pointer drive means provided on the back-face side of the display plate 21 for rotating the pointer 22. The indicating instrument includes a first magnet 22c of ring shape provided in the pointer 22, a second magnet 23a provided in the pointer drive means such that the second magnet 23a is opposite to the first magnet 22c, a rotation drive member 24 included in the pointer drive means and rotating the second magnet 23a, and a magnetic shield member 29 provided between the second magnet 23a and the rotation drive member 24, wherein the pointer 22 is rotated in association with rotation drive of the pointer drive means by attraction force of the first and second magnets 22c, 23a.

7 Claims, 3 Drawing Sheets

U.S. PATENT DOCUMENTS

| | | | |
|---|---|---|---|
| 4,891,987 A * | 1/1990 | Stockton et al. | 73/732 |
| 4,973,905 A * | 11/1990 | Neidhardt | 324/164 |
| 5,582,129 A * | 12/1996 | Furuya | 116/284 |
| 6,216,630 B1 * | 4/2001 | Ogawa et al. | 116/284 |
| 6,470,822 B2 * | 10/2002 | Adams et al. | 116/284 |
| 6,624,608 B2 * | 9/2003 | Komura | 318/696 |
| 7,281,490 B2 * | 10/2007 | Buchanan | 116/271 |
| 7,810,444 B2 * | 10/2010 | Sultan et al. | 116/288 |
| 2008/0100173 A1 * | 5/2008 | Komagata et al. | 310/261 |
| 2010/0043697 A1 * | 2/2010 | Masuda et al. | 116/288 |
| 2010/0064961 A1 * | 3/2010 | Masuda et al. | 116/286 |
| 2010/0127958 A1 * | 5/2010 | Masuda et al. | 345/84 |
| 2010/0328091 A1 * | 12/2010 | Ogasawara et al. | 340/815.78 |
| 2011/0100290 A1 * | 5/2011 | Nakane et al. | 116/286 |

FOREIGN PATENT DOCUMENTS

JP    2003-161650    6/2003

* cited by examiner

A—A

A—A

INDICATING INSTRUMENT

RELATED APPLICATIONS

This application is the U.S. National Phase under 35 U.S.C. §371 of International Application No. PCT/JP2008/072799, filed on Dec. 16, 2008, which in turn claims the benefit of Japanese Application No. 2008-002947, filed on Jan. 10, 2008, the disclosures of which Applications are incorporated by reference herein.

TECHNICAL FIELD

The present invention relates to an indicating instrument in which a pointer points at an indicating portion on a display plate.

BACKGROUND ART

There have been conventionally indicating instruments in which a pointer points at an indicating portion on a dial (display plate). In such an indicating instrument, the pointer is directly secured to a rotation shaft of pointer drive means including a stepping motor or the like (rotation drive member), and the pointer is rotated in association with rotation drive of the pointer drive means and thus caused to point at the indicating portion.

Such a configuration, however, requires a punching step of forming a through hole for passing the rotation shaft through in the dial to complicate the manufacture of the dial, thereby presenting the problem of the inability to manufacture the dial inexpensively. Especially, when a variable display element such as a liquid crystal display element is used for the dial as disclosed in Patent Document 1, a through hole should be formed in a glass substrate of the variable display element to cause the problem of an increase in the manufacture cost of the variable display element.

Patent Document 1: JP-UM-A-3-44624
Patent Document 2: JP-A-2003-161650

To address the problems, the present applicant has proposed an indicating instrument in Patent Document 2 in which a first magnet is provided in a pointer and a second magnet is provided in pointer drive means such that the pointer is rotated in association with rotation drive of the pointer drive means by the magnetic force (attraction force) of the first and second magnets. According to the configuration, the dial can be manufactured easily and inexpensively without requiring formation of a through hole in the display plate.

DISCLOSURE OF THE INVENTION

Problems that the Invention is to Solve

In the indicating instrument as disclosed in Patent Document 2, however, the magnetic fields of the first and second magnets apply the magnetic force not only in the directions of the opposed magnets but also to the overall periphery of the first and second magnets, so that the magnetic influence is exerted upon the magnet contained in the rotation drive member. This magnetic influence may reduce the drive accuracy of the rotation drive member to result in indication errors of the pointer to cause a reduction in indication accuracy. Thus, the indicating instruments have room for improvement.

The present invention has been made in view of the above-mentioned problem, and it is an object thereof to provide an indicating instrument in which a pointer is secured to pointer drive means by attraction force of magnets and the magnetic influence of the magnets can be reduced to improve the indication accuracy of the pointer.

Means for Solving the Problems

To solve the problems, the present invention is characterized by an indicating instrument having a display plate, a pointer provided on a front-face side of the display plate, and pointer drive means provided on a back-face side of the display plate for rotating the pointer, including a first magnet provided in the pointer, a second magnet provided in the pointer drive means such that the second magnet is opposite to the first magnet, a rotation drive member included in the pointer drive means and rotating the second magnet, and a magnetic shield member provided between the second magnet and the rotation drive member, wherein the pointer is rotated in association with rotation drive of the pointer drive means by attraction force of the first and second magnets.

The present invention is characterized in that the magnetic shield member is provided so as to rotate together with the second magnet.

The present invention is characterized by including a circuit substrate on which the rotation drive member is located, wherein the magnetic shield member is provided on the circuit substrate.

The present invention is characterized in that the magnetic shield member is formed to be larger than the projection area of the second magnet.

The present invention is characterized in that the display plate has a variable display element including a variable display portion pointed at by the pointer.

The present invention is characterized by including a support member rotatably supporting the pointer.

The present invention is characterized in that the display plate has a light-transmitting substrate on which the support member is located.

Advantage of the Invention

The present invention relates to an indicating instrument in which a pointer is secured to a pointer drive means by attraction force of magnets and the magnetic influence of the magnets can be reduced to improve the indication accuracy of the pointer.

Figure 1:
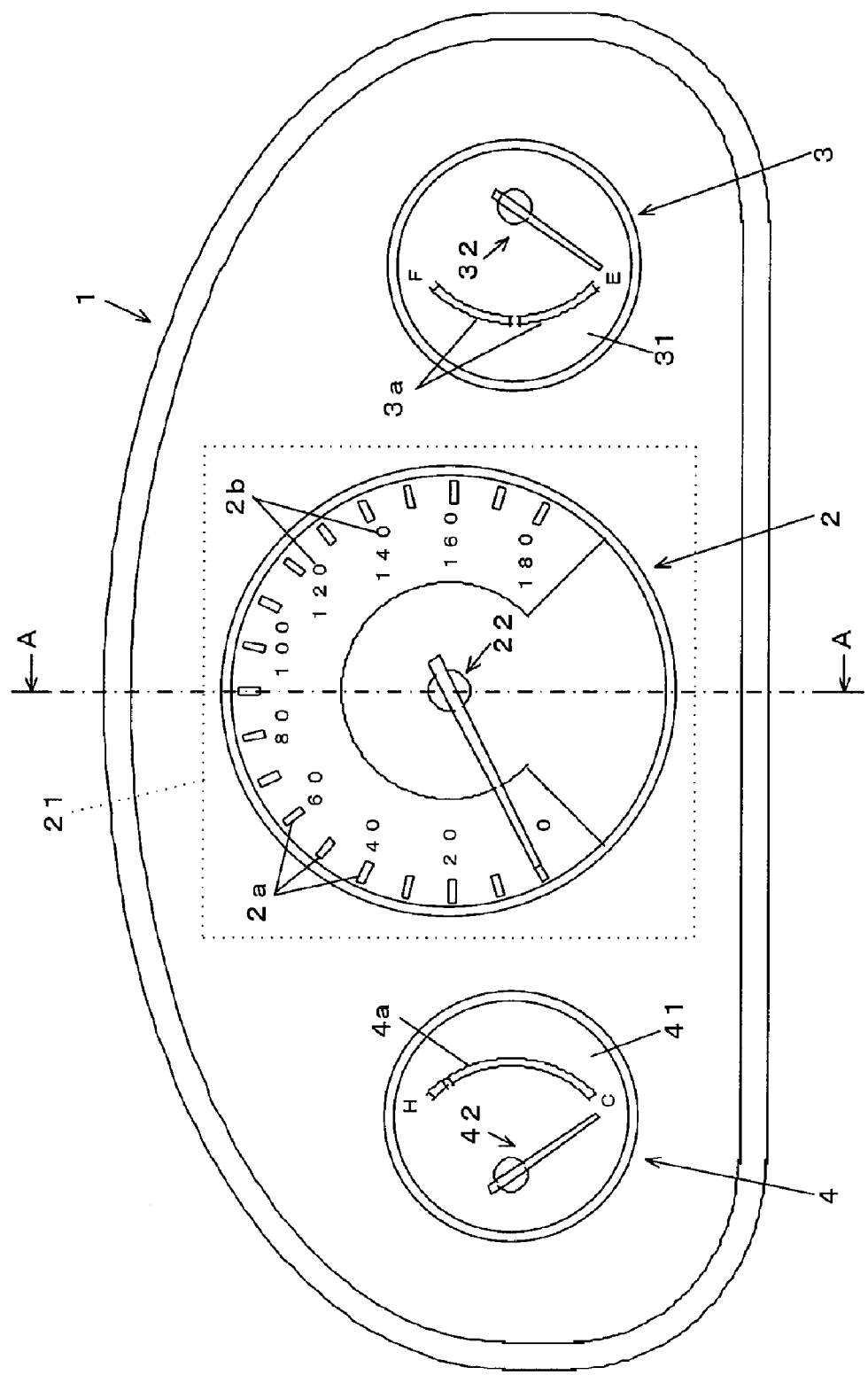
FIG. 1 A front view showing an embodiment of the present invention.

DESCRIPTION OF REFERENCE NUMERALS AND SIGNS 21 display plate
21a light-transmitting substrate
21b liquid crystal display element (variable display element)
22 pointer
22a pointer body
22b pointer cap
22c first magnet
22d first yoke
22e light-receive portion
22f main-shaft receive portion
23 bearing portion 23a second magnet
23b second yoke
24 stepping motor
25 circuit substrate
26 LED (illumination means)
27 main shaft
28 main-shaft receive portion
29, 30 magnetic shield member

BEST MODE FOR CARRYING OUT THE INVENTION

In the following, an embodiment in which the present invention is applied to a vehicle combination meter will be described with reference to the accompanying drawings.

In FIG. 1, reference numeral 1 shows a housing. The housing 1 has a shade member and a case body to accommodate three indicators, that is, a speed meter 2, a fuel meter 3, and a water-temperature meter 4. The speed meter 2 is larger than the fuel meter 3 and the water-temperature meter 4 and is placed between the fuel meter 3 and the water-temperature meter 4. The speed meter 2 has a display plate 21 and a pointer 22. The fuel meter 3 and the water-temperature meter 4 have dials 31, 41, and pointers 32, 42, respectively. The dials 31, 41 are provided by forming light-shield portions through printing on substrates made of light-transmitting resin (for example, polycarbonate) except for indicating portions 3a, 4a, respectively. The pointers 32, 42 are rotated by a stepping motor (not shown) to point at the indicating portions 3a, 4a of the dials 31, 41, respectively.

Figure 2:
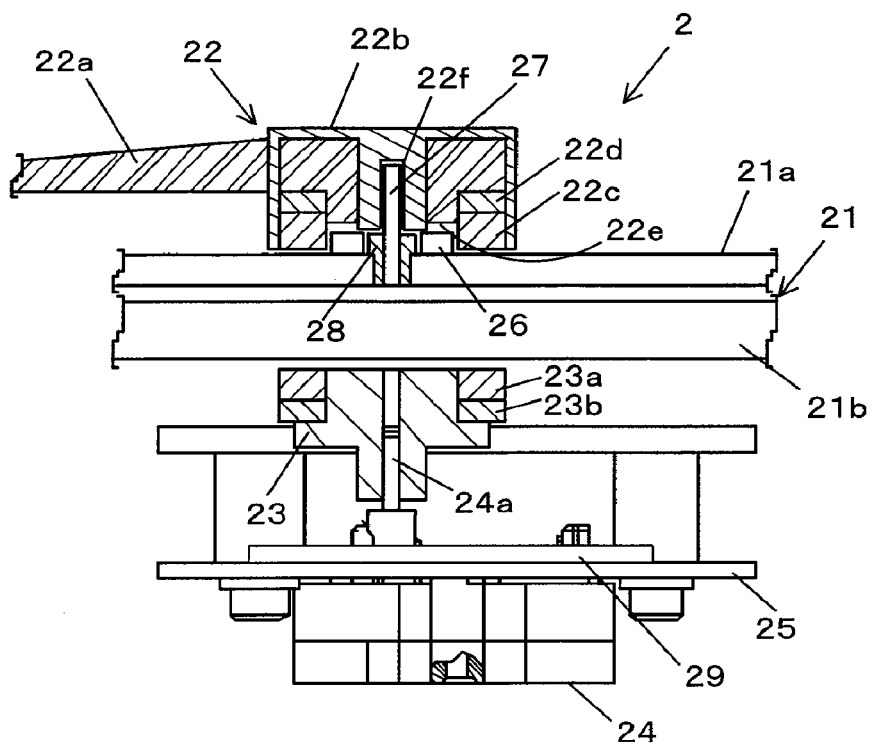
FIG. 2 An enlarged section view of main portions to show the embodiment of the present invention.

FIG. 2 is an enlarged section view showing main portions. The speed meter 2 has the display plate 21, the pointer 22, a bearing portion 23, and the stepping motor (rotation drive member) 24. Reference numeral 25 shows a circuit substrate on which the stepping motor 24 is mounted.

The display plate 21 is formed of a light-transmitting substrate 21a and a liquid crystal display element (variable display element) 21b.

The light-transmitting substrate 21a is made of light-transmitting resin (for example, acrylic or polycarbonate), on which a support member, later described, for rotatably holding the pointer 22 is located.

The liquid crystal display element 21b is provided by sealing-in liquid crystal between a pair of light-transmitting substrates having a transparent electrode film formed thereon to provide a liquid crystal cell and then bonding a polarizing plate onto both surfaces of the liquid crystal cell. For example, a liquid crystal display element of dot-matrix type is used. The liquid crystal display element 21b can display variable contents and can display at least an indicating portion 2a and a character portion 2b.

The pointer 22 has a pointer body 22a, a pointer cap 22b, a first magnet 22c, and a first yoke 22d, and points at the indicating portion 2a displayed by the liquid crystal display element 21b.

The pointer body 22a is made of light-transmitting resin such as polycarbonate, and the pointer cap 22b is fitted at a rotation center portion thereof. The rotation center portion of the pointer body 22a has a hollow portion formed therein for inserting the first magnet 22c and the first yoke 22d. The pointer body 22a also has a light-receive portion 22e for receiving illumination light from an LED (illumination means) 26 placed on the light-transmitting substrate 21a to illuminate the pointer body 22a. The light-receive portion 22e is formed to be positioned in a void portion of the ring-shaped first magnet 22c and first yoke 22d.

The pointer cap 22b is provided by forming non-light-transmitting resin, for example ABS resin, into a substantially tubular shape. The pointer cap 22b holds the first magnet 22c and the first yoke 22d pressed therein. The first magnet 22c and the first yoke 22d may be held with a different method, for example with a method in which a protrusion is formed on the peripheral edge portion of the pointer cap 22b and the protrusion is deformed by the first magnet 22c and the first yoke 22d for holding, or with a method in which a hook (lock means) for locking the first magnet 22c and the first yoke 22d is formed on the peripheral edge portion of the pointer cap 22b. In a central portion of the pointer cap 22b, an insertion portion 22f is provided for inserting a main shaft 27 of generally cylindrical shape which rotatably supports the pointer 22. Reference numeral 28 shows a main-shaft receive portion which is located in a hollow portion formed in the light-transmitting substrate 21a to secure the main shaft 27. In the present embodiment, the main shaft 27 and the main-shaft receive portion 28 constitute the support member for rotatably supporting the pointer 22.

Figure 3:
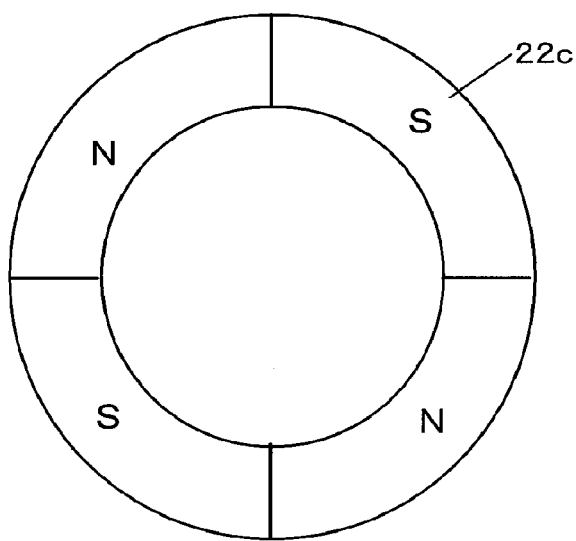
FIG. 3 A diagram showing a first magnet applied to the embodiment of the present invention.

The first magnet 22c is formed in a ring shape and includes a plurality of S poles and N poles alternately magnetized as shown in FIG. 3. In the present embodiment, four poles are magnetized. The first magnet 22c and a second magnet 23a, later described, attract each other.

The first yoke 22d is provided closer to a surface of the first magnet 22c that is not opposite to the second magnet 23a (the non-opposite surface). The first yoke 22d constitutes a magnet circuit which suppresses leakage flux from the non-opposite surface of the first magnet 22c to improve the magnet efficiency.

The bearing portion 23 has the second magnet 23a and a second yoke 23b and is fitted to a rotation shaft 24a of the stepping motor 24. Pointer drive means in the present embodiment is formed of the bearing portion 23 and the stepping motor 24.

The second magnet 23a is placed at the position opposite to the first magnet 22c with the display plate 21 interposed between them to form a pair with the first magnet 22c, and is rotated with rotation drive of the stepping motor 24. Although not shown, the second magnet 23a includes a plurality of S poles and N poles alternately magnetized similarly to the first magnet. The second magnet 23a may be provided with a method in which the bearing portion 23 is formed by using plastic magnet and the portion thereof opposite to the first magnet 22c is magnetized, or with a method in which the second magnet 23a is formed by using a different member from the bearing portion 23 and then insert molding or outsert molding is performed for integral formation.

The second yoke 23b is provided closer to a surface of the second magnet 23a that is not opposite to the first magnet 22c (the non-opposite surface). The second yoke 23b constitutes a magnet circuit which suppresses leakage flux from the non-opposite surface of the second magnet 23a to improve the magnet efficiency.

A magnetic shield member 29 is placed on the circuit substrate 25 between the second magnet 23a and the stepping motor 24. In the present embodiment, the stepping motor 24 is placed on the back-face side of the circuit substrate 25 and the magnetic shield member 29 is placed on the front-face side of the circuit substrate 25. A hole portion is provided in each of the circuit substrate 25 and the magnetic shield member 29, and the rotation shaft 24a passes through these hole portions and protrudes from the front-face side of the circuit substrate 25. The magnetic shield member 29 is made of soft magnetic material (for example, iron, silicon steel sheet, or permalloy). The magnetic shield member 29 is formed to be larger than the projection area of the second magnet 23a.

In the present embodiment, the first magnet 22c is provided in the pointer 22, and the second magnet 23a is provided in the bearing portion 23 secured to the rotation shaft 24a of the stepping motor 24 such that the second magnet 23a is opposite to the first magnet 22c with the display plate 21 interposed between them. When the rotation drive of the stepping motor 24 rotates the second magnet 23a, the pointer 22 can be rotated in association with the rotation drive of the stepping motor 24 since the first magnet 22c and the second magnet 23a attract each other by the magnetic force. Therefore, it is not necessary to form a through hole in the liquid crystal display element 21b of the display plate 21 as in the conventional method in which the pointer is directly secured to the stepping motor, so that the display plate 21 can be manufactured at relatively low cost.

In addition, the magnetic shield member 29 placed between the second magnet 23a and the stepping motor 24 serving as the rotation drive member can shield the magnetic fields of the first and second magnets 22c, 23a to reduce the magnetic influence exerted upon the stepping motor 24. Thus, even when the first and second magnets 22c, 23a are placed close to the stepping motor 24, the indication accuracy of the pointer can be improved. Furthermore, the magnetic shield member 29 formed to be larger than the projection area of the second magnet 23a is more preferable since leakage flux from the outer periphery of the magnetic shield member 29 can be reduced to increase the magnetic shield effect.

The light-transmitting substrate 21a is included in the display plate 21, and the support member for rotatably supporting the pointer 22 is located in the light-transmitting substrate 21a. This eliminates the need to perform processing of the liquid crystal display element 21b for supporting the pointer 22, so that the pointer 22 can be located easily and the liquid crystal display element 21b can be fabricated more inexpensively.

While the first and second magnets 22c, 23a are permanent magnets, the second magnet 23a may be an electomagnet, for example. An organic EL element may be used as the variable display element in addition to the liquid crystal display element 21b, and a segment type may be used in addition to the dot-matrix type. The display plate may have a fixed display element in which a light-shield portion is formed through printing on light-transmitting resin to form a fixed display portion at which the pointer 22 points, for example. The illumination means for illuminating the pointer 22 is not limited to the LED 26. For example, an organic EL element is used for the display plate 21 and the light from the organic EL element is directed toward the light-receive portion 22e. While the stepping motor 24 is included as the pointer drive means, it goes without saying that a cross-coil movement may be used, for example, instead of the stepping motor 24.

Figure 4:
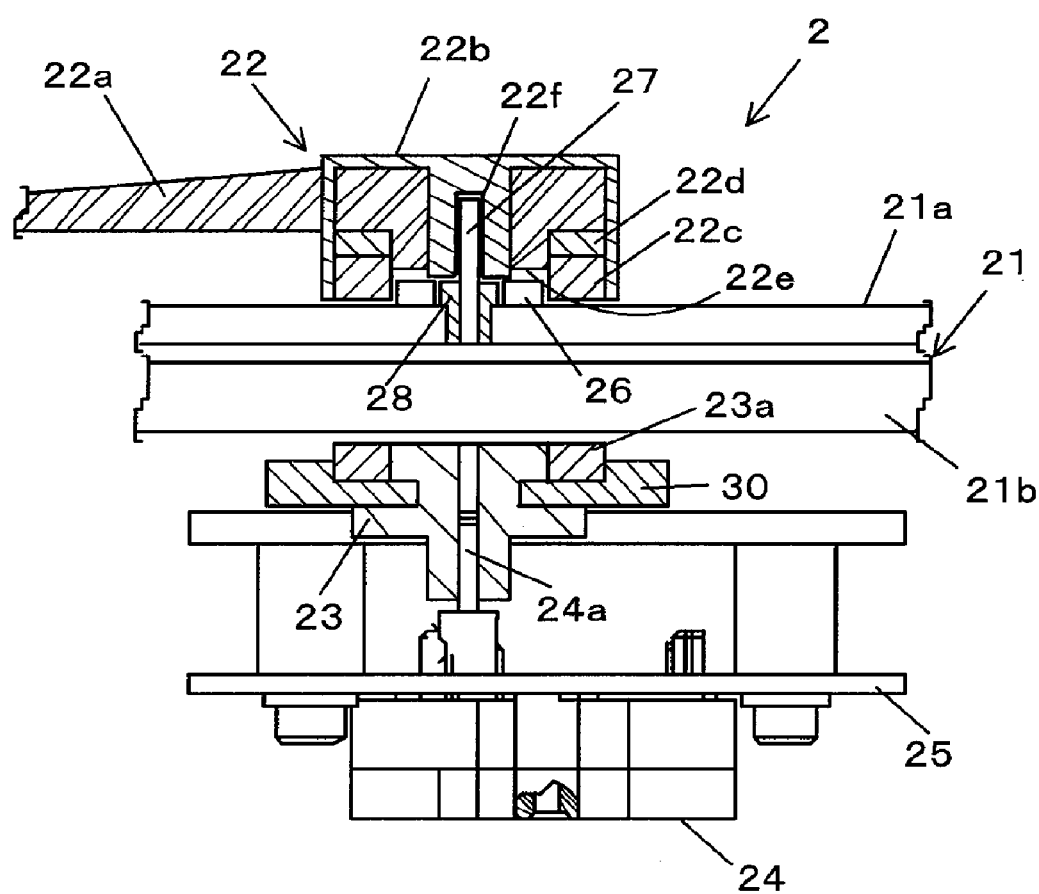
FIG. 4 An enlarged section view of main portions to show another embodiment of the present invention.

FIG. 4 shows another embodiment of the present invention. This differs from the abovementioned embodiment in that a magnetic shield member 30 is located not on a circuit substrate 25 but on a bearing portion 23. In the present embodiment, the magnetic shield member 30 also serves as a second yoke for improving the magnetic efficiency and rotates together with a second magnet 23a. Such a configuration can sufficiently achieve the effects of the present invention.

Industrial Applicability

The present invention relates to an indicating instrument and is preferable for an indicating instrument in which a pointer is secured to a pointer drive means by the attraction force of magnets.

The invention claimed is:

1. An indicating instrument having a display plate, a pointer provided on a front-face side of the display plate, and pointer drive means provided on a back-face side of the display plate for rotating the pointer, comprising a first magnet provided in the pointer, a second magnet provided in the pointer drive means such that the second magnet is opposite to the first magnet, a rotation drive member included in the pointer drive means and rotating the second magnet, and a magnetic shield member provided between the second magnet and the rotation drive member, wherein the shield member shields the magnetic fields of the first and second magnets, and wherein the pointer is rotated in association with rotation drive of the pointer drive means by attraction force of the first and second magnets.

2. The indicating instrument according to claim 1, wherein the magnetic shield member is provided so as to rotate together with the second magnet.

3. The indicating instrument according to claim 1, further comprising a circuit substrate on which the rotation drive member is located, wherein the magnetic shield member is provided on the circuit substrate.

4. The indicating instrument according to claim 1, wherein the magnetic shield member is formed to be larger than a projection area of the second magnet.

5. The indicating instrument according to claim 1, wherein the display plate has a variable display element including a variable display portion pointed at by the pointer.

6. The indicating instrument according to claim 1, further comprising a support member rotatably supporting the pointer.

7. The indicating instrument according to claim 6, wherein the display plate has a light-transmitting substrate on which the support member is located.

* * * * *